J. CRUIKSHANK.

LAMP SHADE HOLDER.

APPLICATION FILED APR. 19, 1911.

Reissued Nov. 28, 1911. 13,322.

WITNESSES

George Bramley

Rudy. Hoster

INVENTOR

John Cruikshank

BY Munn & Co.

ATTORNEYS

UNITED STATES PATENT OFFICE.

JOHN CRUIKSHANK, OF SHAMOKIN, PENNSYLVANIA, ASSIGNOR OF ONE-THIRD TO JOSEPH M. DUNKELBERGER, OF MOUNT CARMEL, PENNSYLVANIA.

LAMP-SHADE HOLDER.

13,322. Specification of Reissued Letters Patent. Reissued Nov. 28, 1911.

Original No. 897,194, dated August 25, 1908, Serial No. 417,673. Application for reissue filed April 19, 1911. Serial No. 622,144.

*To all whom it may concern:*

Be it known that I, JOHN CRUIKSHANK, a citizen of the United States, and a resident of Shamokin, in the county of Northumberland and State of Pennsylvania, have invented a new and Improved Lamp-Shade Holder, of which the following is a full, clear, and exact description.

The invention relates to certain improvements in holders for supporting lamp shades, and more particularly to a holder especially adapted for use in connection with incandescent electric light. In the common form of construction it is necessary to provide a plurality of radially disposed screws, movable into and out of engagement with the shade, or to provide gripping members movable horizontally within the tubular body of the holder, but in my improved construction all screws are eliminated and the gripping ends of the gripping members are caused to slide inward and upward from a point outside of the rim of the tubular body, and a single movement of a single operating member serves for the operation of all the gripping members.

Reference is to be had to the accompanying drawings forming a part of this specification, in which similar characters of reference indicate corresponding parts in all the figures, and in which—

Figure 1:
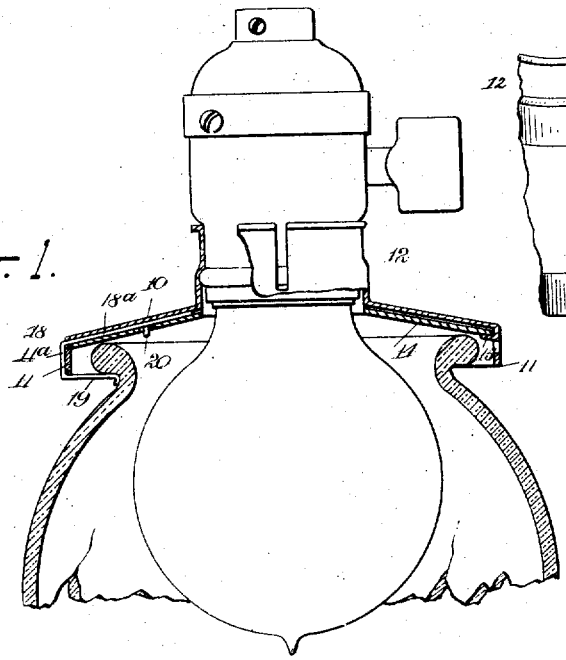
Figure 5:
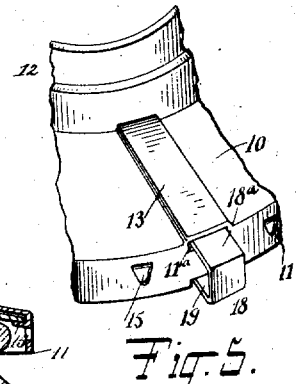
Figure 2:
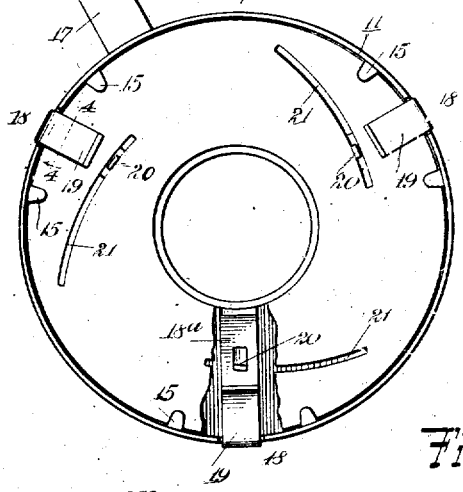
Figure 3:
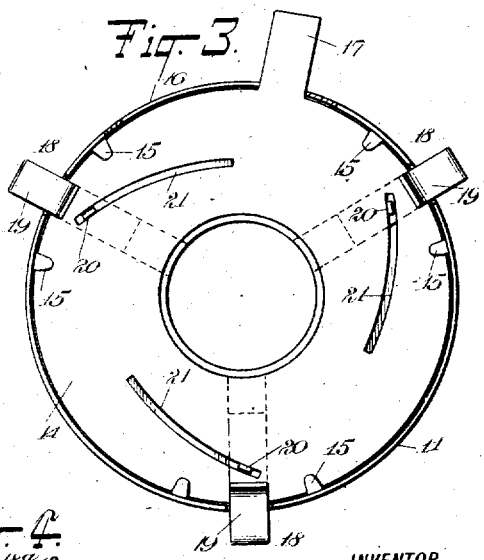
Figure 4:
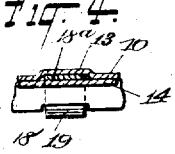

Figure 1 is a section through a shade holder constructed in accordance with my invention and illustrated as being applied to an incandescent lamp and shade thereof; Fig. 2 is a view of the under side of the holder with the gripping members or hooks in their operative or gripping position, part of the operating cam plate being broken out; Fig. 3 is a view similar to Fig. 2 but showing the gripping members in their inoperative or outer position, part of the rim of the tubular body being in section; Fig. 4 is a sectional detail on the line 4—4 of Fig. 2; and Fig. 5 is a perspective view of part of the tubular body and showing more particularly one of the guideways and the corresponding gripping member.

My improved holder is extremely simple in construction, the entire device being preferably formed of a tubular body of sheet metal, cut and stamped to the desired form, an operating plate and a plurality of gripping members, which are brought into or out of position by the movement of the said operating plate on the tubular body. In the specific form illlustrated, the tubular body 10 is substantially annular and conical in form, and at the outer edge of the body is a depending flange or a rim 11, and at the opposite edge there is a collar 12, slotted and beaded, to adapt it to the socket of an incandescent electric light, so as to be resiliently held in place. It is evident that the collar may be fastened to the socket in any suitable manner desired. The body is stamped to form on its under side a plurality of radially-disposed inclined guideways or grooves 13 for the reception of the shanks 18ª of radially movable gripping members or hooks 18, hereinafter described.

The guideways or grooves are of a depth and width substantially equal to the thickness and width of the shanks 18ª of the gripping members 18, as is clearly shown in Fig. 4, whereby after the gripping members 18 are inserted in place their outer surfaces will lie substantially flush with the inner surface of the operating plate 14, which thus closes the under side of the guideways or grooves 13. The operating sheet metal plate 14 is annular and conical in form, and disposed adjacent the under surface of the body 10. The operating plate 14 is held in close engagement with the body 10 in any suitable manner, as, for instance, by small lugs 15 stamped out of the annular flange 11 and extending inwardly into engagement with the under side of the operating plate 14. These lugs hold the operating plate 14 in engagement with the body 10, but permit the free rotation of one in respect to the other. The rim or flange 11 for a limited distance is provided with a slot 16, through which extends a handle 17 forming part of the plate 14, and by means of which the plate 14 is rotated, and which also serves to limit the extent of said rotation.

Disposed within each of the radial guideways or grooves 13 in the under surface of the body 10, I provide a plurality of gripping members or hooks 18, each of which is preferably formed of a sheet metal shank 18ª lying within the guideway or groove 13 and extending through an aperture 11ª in the base of the flange or rim 11. The outer end of each shank 18ª extends down adjacent the outer surface of the flange or rim 11, and is bent inwardly to form a hook or operating end 19 for engagement with the bead or rim of the lamp shade. Each shank is provided with a lug 20, preferably integral with the shank and formed by stamping downwardly a portion thereof, and each of these lugs extends through a corresponding cam slot 21 in the operating plate 14. The cam slots 21 in the operating plate 14 are symmetrically disposed in respect to the center of the shade holder, and each extends diagonally from adjacent the periphery of the plate 14 to adjacent the center thereof. The cam slots 21 in the operating plate 14 may be of any form desired, that is, either straight or curved, but their inner ends preferably extend substantially tangentially of the collar 12. By means of the handle 17, the operating plate 14 may be rotated, and due to the shape of the cam slots 21 and their engagement with the lugs 20 of the gripping members, the latter are moved simultaneously either inwardly and upwardly or outwardly and downwardly, according to the direction in which the handle is turned.

It is understood that as the body 10 and the operating plate 14 are conical, the guideway or grooves 13 are inclined inwardly and upwardly, and hence the gripping members 18 when actuated on turning the handle 17 in one direction move bodily in an inward and upward direction, and as the inwardly turned hook ends 19 engage the usual annular bead or rim of the lamp shade, the latter is drawn upward in firm contact with the under side of the operating plate 14, whereby the lamp shade is securely attached to the holder and the latter is rendered insect proof when ball shades are used.

It is understood that when the lamp shade is supported by the hook ends 19 of the gripping members 18 then the shanks 18ª rest on the bottom edge of the apertures 11ª in the base of the rim whereby the weight or burden of the lamp shade is carried by the holder proper and not by the operating plate 14. It will be observed that the hooks during their inward and upward movement draw the shade up and hold it rigidly to its seat, thereby making the holder shatter-proof when subjected to vibration, and this same action makes it also an insect-proof holder when ball shades are used, because there is no opening between the neck of the shade and the inside surface of the holder through which insects could gain entrance. It is further understood that by the arrangement described, the shade is not only grasped between the ends of the hook ends, but is also clamped between the hook ends and the inner surface of the operating plate 14. When it is desired to release the shade the handle 17 is moved in an opposite direction to cause the gripping members to slide downward and outward, thus releasing the shade.

The hooks may be retained in operative position by any suitable means, as, for instance, a slight depression may be provided at the end of the slot 16 into which the handle 17 may enter.

By reference to the drawings, it will be noticed that the hook ends 19 extend to the outside of the rim or flange 11, and during the engaging movement the hook ends are moved inward, and are moved in a reverse direction during the releasing movement. Thus by the construction shown and described the diameter of the tubular body 10 of the holder can be reduced to a minimum, and by arranging the guideways or grooves 13 for the shanks of the gripping members on the under side of the body 10 and passing the said shanks through slots in the annular flange or rim 11, the strain incident to the supported shade is transmitted to the tubular body 10.

As will be noted, the holder is very simple in construction and composed of a minimum number of parts. The body serves not only for the attachment of the device to the socket but also serves as guideways for the gripping members and serves for locking the operating plate thereto and limiting its rotation.

The operating plate or member is formed with its handle integral therewith, and due to its shape and its engagement with the gripping members the latter are operated simultaneously. The gripping member is also very simple as the guiding portion, the gripping portion and the operating lugs are all formed from a single piece of metal. The grooves are so formed that the ratio of the radial movement of the gripping members to the rotary movement of the operating member varies so that the movement of the gripping members is slower the nearer they approach the center, and thus a greater leverage is obtained and the liability of the gripping members working loose is avoided.

Various changes may be made in the construction of the device and within the scope of the appended claims without departing from the spirit of my invention.

Having thus described my invention, I claim as new and desire to secure by Letters Patent:

1. A shade holder, comprising two relatively movable conical body members, means for securing one of said members to a lamp socket, a plurality of gripping members each having a guiding portion interposed between the said body members and radially movable in respect thereto, and a gripping portion adapted to engage the lamp shade and move the same in the direction of the axis of the holder and in clamping contact with one of the said body members, one of the said conical body members having a plurality of slots and each of the said guiding portions having a lug extending through the corresponding slot, and means for rotating one of the said body members in respect to the other, whereby the said gripping members are moved simultaneously.

2. A shade holder, comprising a conical tubular body having a collar at the apex thereof for engagement with a lamp socket, and having an annular flange adjacent the base thereof, said body being stamped to form a plurality of radially-disposed guideways in its inner surface and extending from the said collar to said flange, and said flange being provided with apertures adjacent the ends of said grooves, a conical operating plate disposed adjacent the inner surface of the said body and rotatably mounted in respect thereto, a plurality of gripping members each having a guiding portion intermediate the said body and plate and within the corresponding groove in the body and extending through the opening in said flange, and having a hook extending inwardly, and means whereby the rotation of the operating plate simultaneously, moves the gripping members in their grooves.

3. A shade holder, comprising a substantially conical body having a plurality of radially-disposed grooves in the under surface thereof, an operating plate adjacent the said body and covering the said grooves, means for securing the body to a lamp socket, a plurality of gripping members each having a guiding portion disposed intermediate the said body and operating plate and within one of the said grooves, and a hook portion, all of said hook portions lying in substantially the same plane, and means whereby the rotation of the said operating plate in respect to the said body moves said gripping members radially and raises said hook portions toward said operating plate to grip a shade between the said hook portions and between the said operating plate and said hook portions.

4. A shade holder, comprising a conical body having a rim provided with apertures in the base of the rim, the body having guideways in alinement with the said apertures, gripping members each having a shank, a hook and a lug, the shank slidably engaging a corresponding guideway and extending through the adjacent aperture in the rim, and the said hooks being adapted to grip the lamp shade over the outer edge of the rim to support the lamp shade, the shanks of the gripping members abutting against the under side of the said guideways, and the outer ends of the shanks of the gripping members bearing on the base of the rim, and a manually-controlled operating plate having cam slots engaging the lugs of the said gripping members to move the latter inwardly and upwardly or downwardly and outwardly according to the direction in which the said operating plate is turned.

5. A shade holder, comprising a body having radially-disposed inclined guideways, gripping members for engagement with a lamp shade and mounted to slide in the said guideways, and a manually-controlled operating plate mounted to turn on the said body and adapted to form a seat for the lamp shade, the said operating plate engaging the said gripping members to move the same inwardly and upwardly or downwardly and outwardly according to the direction in which the said operating plate is turned.

6. A shade holder, comprising a conical tubular body provided with radially-disposed inclined guideways and provided at its base with a rim having apertures at the outer ends of the said guideways, gripping members having shanks extending in the said guideways and passing through the said rim apertures, the outer ends of the shanks terminating in hook ends extending inward over the edge of the said body rim for engagement with the lamp shade, and a manually-controlled operating plate mounted to turn on the said body and adapted to form a seat for the lamp shade, the said operating plate engaging the said gripping members to move the same inwardly and upwardly or downwardly and outwardly according to the direction in which the said operating plate is turned.

7. A shade holder, comprising a conical body, having guideways pressed in the back of the said body, the said body having a rim provided with apertures in alinement with the said guideways, gripping members slidably mounted in the said guideways and extending through the said apertures, the gripping members having hooks adapted to grasp a lamp shade over the outer edge of the said rim, and operating means for imparting movement in unison with the said gripping members.

8. A shade holder, comprising a body provided with radially-disposed inclined guideways, gripping members mounted to slide in the said guideways for engaging or releasing the shade, the said gripping members on the engaging movement moving bodily inward and upward, and on the said releasing movement moving bodily outward and downward, and manually-controlled means for imparting movement to the said gripping members.

9. A shade holder, comprising a conical tubular body provided with radially-disposed inclined guideways, and provided at its base with a rim, a conical operating plate mounted to turn on the under side of the said conical body and provided with cam slots, gripping members having shanks mounted to slide in the said inclined guideways, the shanks having lugs extending into the said cam slots and the shanks terminating in gripping ends extending to the outside of the said rim and adapted to move inward and upward on turning the said operating plate, to grip a lamp shade and draw the same against the operating plate, and means for turning the said operating plate.

In testimony whereof I have signed my name to this specification in the presence of two subscribing witnesses.

JOHN CRUIKSHANK.

Witnesses:
WM. E. RESSLER,
KATHRYN RESSLER.